(12) United States Patent
Shi et al.

(10) Patent No.: US 11,404,031 B2
(45) Date of Patent: Aug. 2, 2022

(54) DISPLAY CONTROL DEVICE, DISPLAY CONTROL METHOD, AND DISPLAY SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Tiankuo Shi, Beijing (CN); Lingyun Shi, Beijing (CN); Wei Sun, Beijing (CN); Bo Gao, Beijing (CN); Yue Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 841 days.

(21) Appl. No.: 16/070,831

(22) PCT Filed: Dec. 15, 2017

(86) PCT No.: PCT/CN2017/116369
§ 371 (c)(1),
(2) Date: Jul. 18, 2018

(87) PCT Pub. No.: WO2018/205608
PCT Pub. Date: Nov. 15, 2018

(65) Prior Publication Data
US 2021/0183341 A1    Jun. 17, 2021

(30) Foreign Application Priority Data

May 12, 2017   (CN) .......................... 201710334364.7

(51) Int. Cl.
*G09G 5/37* (2006.01)
*G06F 3/01* (2006.01)
*G09G 5/14* (2006.01)

(52) U.S. Cl.
CPC ............... *G09G 5/37* (2013.01); *G06F 3/013* (2013.01); *G09G 5/14* (2013.01); *G09G 2340/0407* (2013.01); *G09G 2354/00* (2013.01)

(58) Field of Classification Search
None
See application file for complete search history.

(56) References Cited

U.S. PATENT DOCUMENTS 6,417,867 B1  7/2002 Hallberg
2002/0141614 A1* 10/2002 Lin ..................... H04N 19/17
                                                382/103

(Continued)

FOREIGN PATENT DOCUMENTS

CN    101256477    9/2008
CN    102090063    6/2011

(Continued)

OTHER PUBLICATIONS

First Office Action for Chinese Patent Application No. 201710334364.7 dated Oct. 9, 2018.

(Continued)

*Primary Examiner* — Tapas Mazumder
(74) *Attorney, Agent, or Firm* — Calfee, Halter & Griswold LLP

(57) ABSTRACT

A display control device for use with a display device, including an image pre-processor configured to divide, based on an identification of a gaze region in a screen of the display device, an original image into a target area corresponding to the gaze region and a non-target area other than (Continued)

the target area, the image pre-processor being further configured to perform pre-processing on the non-target area, the pre-processing comprising reducing a resolution of the non-target area; and a communication interface configured to transmit the target area and the pre-processed non-target area to the display device for display at the gaze region and a region other than the gaze region in the screen, respectively.

8 Claims, 3 Drawing Sheets

(56) References Cited

U.S. PATENT DOCUMENTS

| | | | | |
|---|---|---|---|---|
| 2003/0160915 A1* | 8/2003 | Liu | ................... | G02F 1/133514 349/106 |
| 2008/0291221 A1 | 11/2008 | Yamada et al. | | |
| 2009/0207195 A1 | 8/2009 | Chin et al. | | |
| 2011/0102627 A1 | 5/2011 | Okada | | |
| 2014/0341450 A1* | 11/2014 | Sedan | ................... | G16H 30/20 382/128 |
| 2015/0371583 A1 | 12/2015 | Guo et al. | | |
| 2017/0200427 A1 | 7/2017 | He et al. | | |
| 2018/0366075 A1* | 12/2018 | Wu | ....................... | G09G 3/3607 |

FOREIGN PATENT DOCUMENTS

| | | |
|---|---|---|
| CN | 103886825 A | 6/2014 |
| CN | 103886825 | 8/2014 |
| CN | 103974115 A | 8/2014 |
| CN | 105139791 A | 12/2015 |
| CN | 105915907 | 8/2016 |
| CN | 106531073 A | 3/2017 |
| CN | 106920501 A | 7/2017 |
| CN | 106935224 A | 7/2017 |

OTHER PUBLICATIONS

Search Report and Written Opinion for International Application No. PCT/CN2017/116369 dated Mar. 14, 2018.

* cited by examiner

DISPLAY CONTROL DEVICE, DISPLAY CONTROL METHOD, AND DISPLAY SYSTEM

CROSS REFERENCE TO RELATED APPLICATIONS

This application is the U.S. national phase entry of PCT/CN2017/116369, with an international filing date of Dec. 15, 2017, which claims the benefit of Chinese Patent Application No. 201710334364.7 filed on May 12, 2017, the entire disclosures of which are incorporated herein by reference.

TECHNICAL FIELD

The present disclosure relates to the field of display technology, and particularly to a display control device, a display control method, and a display system.

BACKGROUND

High resolution display devices have become popular in the market. The images supplied to such a display device have such a high resolution that it takes a relatively long time for them to be transmitted from a signal source to the display device with the transmission speed being constant. This may affect the user's viewing experience.

SUMMARY

It would be advantageous to provide a mechanism that may alleviate, mitigate or eliminate the above-mentioned problem.

According to an aspect of the present disclosure, a display control device for a display device is provided. The display control device comprises: an image pre-processor configured to divide, based on an identification of a gaze region in a screen of the display device, an original image into a target area corresponding to the gaze region and a non-target area other than the target area, the image pre-processor being further configured to perform pre-processing on the non-target area, the pre-processing comprising reducing a resolution of the non-target area; and a communication interface configured to transmit the target area and the pre-processed non-target area to the display device for display at the gaze region and a region other than the gaze region in the screen, respectively.

In certain exemplary embodiments, the display control device further comprises a gaze tracker configured to identify the gaze region in the screen of the display device and provide the identification to the image pre-processor.

In certain exemplary embodiments, the display device comprises a pixel array arranged in a pattern for sub-pixel rendering. The display control device further comprises an image renderer configured to perform the sub-pixel rendering on at least the target area such that the sub-pixel rendered target area can be displayed at the gaze region with an apparent resolution higher than a physical resolution of the display device.

In certain exemplary embodiments, the display control device further comprises an image formatter configured to perform formatting on at least one of the target area or the pre-processed non-target area. The formatting comprises padding the at least one of the target area or the pre-processed non-target area with default data to satisfy a transmission specification adopted by the communication interface.

According to another aspect of the present disclosure, a display system is provided comprising: a display device; and the display control device recited above.

According to yet another aspect of the present disclosure, a display control method is provided comprising: dividing, based on an identification of a gaze region in a screen of a display device, an original image into a target area corresponding to the gaze region and a non-target area other than the target area; pre-processing the non-target area, the pre-processing comprising reducing a resolution of the non-target area; and transmitting the target area and the pre-processed non-target area to the display device for display at the gaze region and a region other than the gaze region in the screen, respectively.

According to still yet another aspect of the present disclosure, a display control device for use with a display device is provided, comprising: means for dividing, based on an identification of a gaze region in a screen of the display device, an original image into a target area corresponding to the gaze region and a non-target area other than the target area; means for pre-processing the non-target area, the pre-processing comprising reducing a resolution of the non-target area; and means for transmitting the target area and the preprocessed non-target area to the display device for display at the gaze region and a region other than the gaze region in the screen, respectively.

These and other aspects of the present disclosure will be apparent from and elucidated with reference to the embodiment(s) described hereinafter.

BRIEF DESCRIPTION OF THE DRAWINGS

The accompanying drawings are provided for a better understanding of the present disclosure and form a part of the specification. In the drawings.

DETAILED DESCRIPTION

Embodiments of the present disclosure will be described in detail below with reference to the accompanying drawings.

Figure 1:
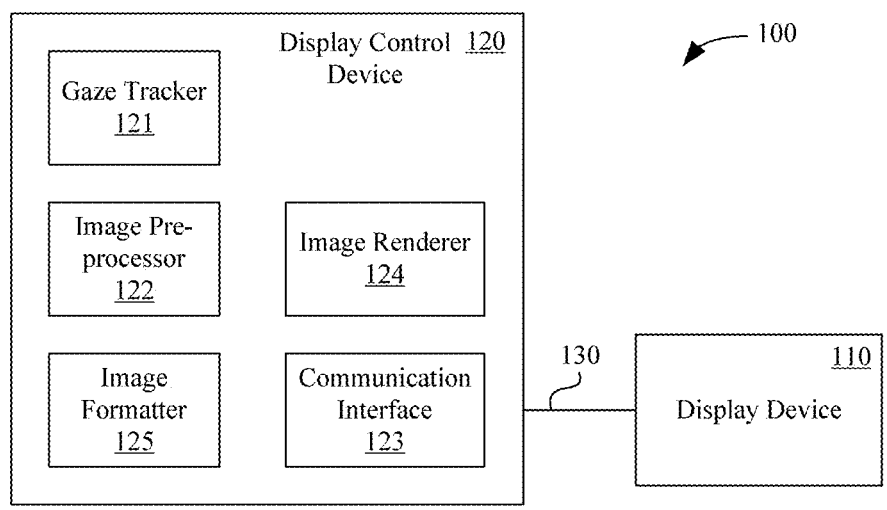
FIG. 1 is a schematic block diagram of a display system including a display device and a display control device according to an embodiment of the present disclosure.

FIG. 1 is a schematic block diagram of a display system 100 according to an embodiment of the present disclosure. As shown in FIG. 1, the display system 100 includes a display device 110 and a display control device 120, both of which are connected through a communication medium 130 such as an HDMI cable. Examples of the display device 110 include, but are not limited to, a television, a monitor, or a head mounted display (e.g., in a virtual reality (VR) application scenario). The display control device 120 is generally positioned at a signal source (not shown) that supplies the display device 110 with video/image data. Depending on the specific application scenario, the signal source may take the form of, for example, a DVD player, a game console, a personal computer, a mobile phone, and the like. The display control device 120 includes a gaze tracker 121, an image pre-processor 122, and a communication interface 123.

The gaze tracker 121 is configured to identify a gaze region in a screen of the display device 110, i.e., a region in the screen that is viewed by the user. Any known or future gaze tracking technique may be used in the gaze tracker 121. The gaze tracker 121 may generally include a camera that captures the user's eye movements and other hardware and software resources that calculate the user's gaze region from the data captured by the camera. Although the gaze tracker 121 is shown in FIG. 1 as an integral part of the display control device 120, this is not required. In one implementation, the gaze tracker 121 may be formed as an accessory to the display device 110 and positioned at or near the display device 110 in order to monitor the user's gaze. In another implementation, the camera and other hardware and software resources of the gaze tracker 121 may be distributed separately from each other. For example, the camera may be located at or near the display device 110 and the other hardware and software resources may be included in the display control device 120 that is separate from the display device 110. The gaze tracker 121 can deliver the identification of the gaze region in the screen of the display device 110 to the image pre-processor 122 via any suitable communication medium. In embodiments where the gaze tracker 121 is positioned at or near the display device 110, the gaze tracker 121 may communicate the identification of the gaze region in the screen of the display device 110 to the image pre-processor 122, for example, via the communication medium 130 shown in FIG. 1.

Figure 2:
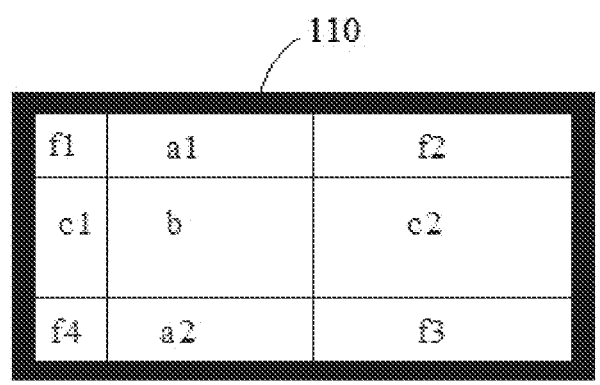
FIG. 2 is a schematic diagram of a screen of a display device with a gaze region being identified.

Referring to FIG. 2, the screen of the display device 110 is schematically shown that has an identified gaze region b. The gaze region b is shown in the example of FIG. 2 as being located at the center of the screen, surrounded with a non-gaze region including eight sub-regions f1, a1, f2, c2, f3, a2, f4, and c1. However, the present disclosure is not limited thereto. For example, the gaze region b may be located anywhere in the screen.

Referring back to FIG. 1, the image pre-processor 122 is configured to divide an original image from a signal source (not shown) into a target area corresponding to the gaze region and a non-target area other than the target area based on the identification of the gaze region. The image pre-processor 122 is also configured to pre-process the non-target area, for example, to reduce the resolution of the non-target area. The reduction in resolution can be achieved by, for example, down-sampling. An image with a non-target area having a reduced resolution can be more quickly transmitted from the signal source to the display device 110, especially taking into account the fact that the non-target area occupies a larger proportion of the image with respect to the target area corresponding to the gaze region. Moreover, since the image portion of the non-target area corresponds to the region that is not viewed by the user in the screen of the display device 110, the reduction in the resolution of the non-target area does not result in a reduction in the user's viewing experience.

Figure 3:
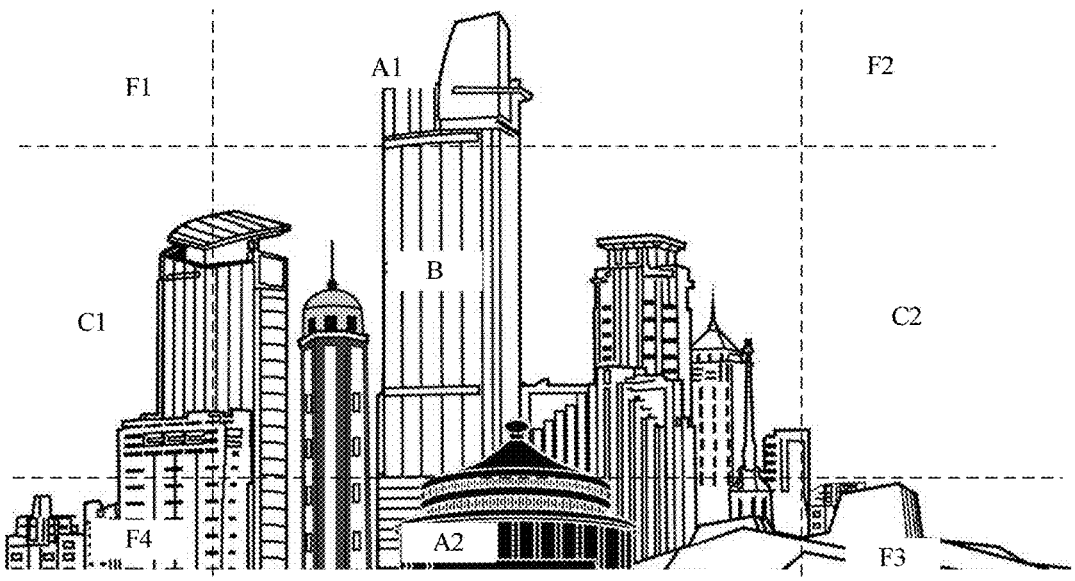
FIG. 3 is a schematic diagram of an original image provided by a signal source to a display control device.

Referring to FIG. 3, an original image provided by the signal source to the display control device 120 is schematically shown. The image is now divided by the image pre-processor 122 shown in FIG. 1 into a target area B corresponding to the gaze region b shown in FIG. 2 and non-target areas F1, A1, F2, C2, F3, A2. F4 and C1 corresponding to the non-gaze sub-regions f1, a1, f2, c2, f3, a2, f4, and c1, respectively. The non-target areas F1, A1, F2, C2, F3, A2, F4, and C1 may be further pre-processed by the image pre-processor 122.

Referring back to FIG. 1, the communication interface 123 is configured to transmit the target area (e.g., the area B shown in FIG. 3) and the preprocessed non-target areas (e.g., the areas F1, A1, F2, C2, F3, A2, F4, and C1 shown in FIG. 3) to the display device 110 for display at the gaze region (e.g., the area b shown in FIG. 2) and the region other than the gaze region (e.g., the areas F1, A1, F2, C2, F3, A2, F4, and C1 shown in FIG. 2), respectively.

The display control device 120 may optionally include an image renderer 124. The image renderer 124 may be operable to perform sub-pixel rendering (SPR) on the target area and optionally the non-target area of the original image. As is known, SPR is a technique for improving the apparent resolution of a display by rendering the pixels to take into account the physical properties of the screen type. The SPR technique can be applied to a display device that includes a pixel array arranged in a pattern for SPR so as to display the rendered image with an apparent resolution higher than the physical resolution of the display device. One example of such a pixel array is the so-called delta pixel arrangement, which can be found in Chinese Patent Publication No. CN103886825A incorporated herein by reference. Specifically, the delta pixel arrangement includes a plurality of sub-pixels arranged in an array, with every two adjacent rows of sub-pixels being misaligned relative to each other by half a width of the sub-pixel, and each sub-pixel having a different color than that of a neighboring one in an adjacent row. SPR algorithms suitable for such a delta pixel arrangement can also be found in this Chinese patent publication and therefore are not described in detail herein. Other SPR algorithms are possible in other embodiments. The presence of the image renderer 124 may be advantageous for improving the user's viewing experience in that the target area after sub-pixel rendering may be displayed at a higher apparent resolution on the display device 110.

The display control device 120 may further optionally include an image formatter 125 configured to format at least one of the target area or the non-target area that has preprocessed by the image pre-processor 122. In embodiments in which the communication interface 123 of the display control device 120 requires a specific transmission specification to transmit image data to the display device 110, the specific transmission specification may be satisfied by the image formatter 125 formatting the target area and/or the pre-prepared non-target area. For example, the image formatter 125 may pad (pad) the target area and/or the preprocessed non-target area with default data (e.g., a gray-scale value of 0) in order to comply with the specific transmission specification. By so doing, the display control device 120 can adapt to the variation of the payload in the communication with the display device 110 (for example, due to a change in the size of the gaze region) without modifying the transmission specification adopted by the communication interface 123 of the display control device 120. This can improve the compatibility of the display control device 120 with various display devices 110 or gaze trackers 121. In other embodiments, other formatting operations are of course possible.

In the above embodiments, the image pre-processor 122, the communication interface 123, the image renderer 124, and the image formatter 125 may each be implemented in hardware, software, firmware, or any combination thereof. For example, combinational logic may be used to implement the functions of image pre-processor 122, communication interface 123, image renderer 124, and/or image formatter 125.

Figure 4:
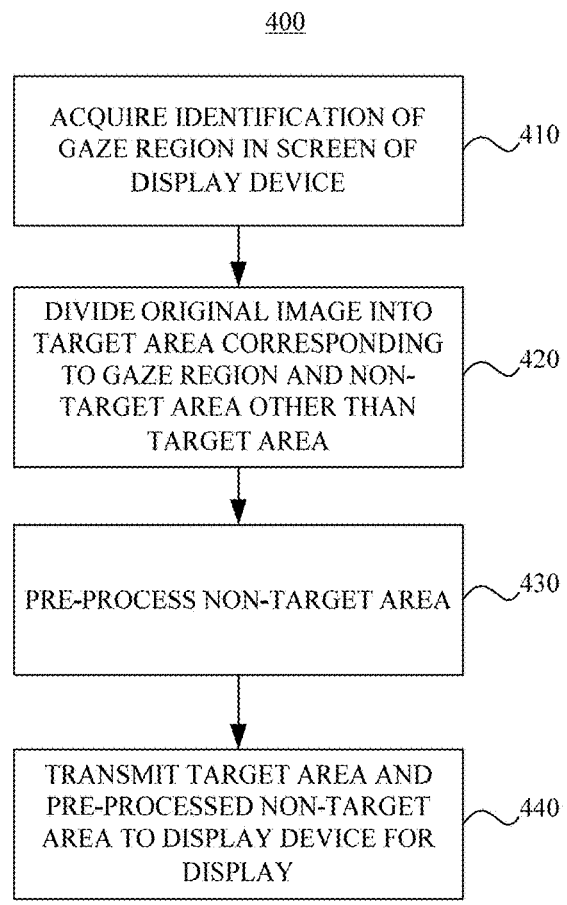
FIG. 4 is a flowchart of a display control method according to an embodiment of the present disclosure.

FIG. 4 is a flow chart of a display control method 400 according to an embodiment of the present disclosure.

At step 410, an identification of the gaze region in a screen of a display device is acquired. This can be achieved using the gaze tracker 121 as shown in FIG. 1. Step 410 may be optional. At step 420, an original image supplied by a signal source is divided into a target area corresponding to the gaze region and a non-target area other than the target area based on the identification of the gaze region in the screen of the display device. At step 430, the non-target area is pre-processed. The preprocessing includes reducing the resolution of the non-target region. Steps 420 and 430 may be implemented using the image pre-processor 122 as shown in FIG. 1. At step 440, the target area and the pre-processed non-target area are transmitted to the display device for display at the gaze region and the region other than the gaze region in the screen, respectively. Step 440 may be implemented using the communication interface 123 as shown in FIG. 1.

In some embodiments, the method 400 may further include performing sub-pixel rendering on the target area and optionally the non-target area such that the sub-pixel rendered target area can be displayed at the gaze region with an apparent resolution higher than the physical resolution of the display device. This may be accomplished using the image renderer 124 as shown in FIG. 1.

In some embodiments, the method 400 may further include formatting at least one of the target area or the pre-processed non-target area. The formatting may include padding the target area and/or the pre-processed non-target area with default data. This can be achieved using the image formatter 125 as shown in FIG. 1.

According to an aspect of the present invention, in a driving method of a display device, the position of the eye gaze area on the display device is obtained. The original image is preprocessed to obtain a transmission image. This preprocessing includes dividing the original image into a target area and a surrounding area, wherein the position of the target area corresponds to the position of the eye gaze area, and the area other than the target area on the original image is the surrounding area, the peripheral area is compressed to form a transmission area, and the transmission area forms an intermediate image with the target area, and a compensation image is set around the intermediate image to obtain a transmission image. The transmission image is rectangular, and the resolution of the transmission image is less than that of the display device. The transmission image is transmitted to the display device. The eye gaze area is controlled to display the target area. The transmission area and the compensation image in the transmission image are amplified so that the enlarged transmission area matches the surrounding display area of the display device, wherein the surrounding display area is an area on the display device other than the eye gaze area. The surrounding display area is controlled to display the enlarged transmission area.

Figure 5:
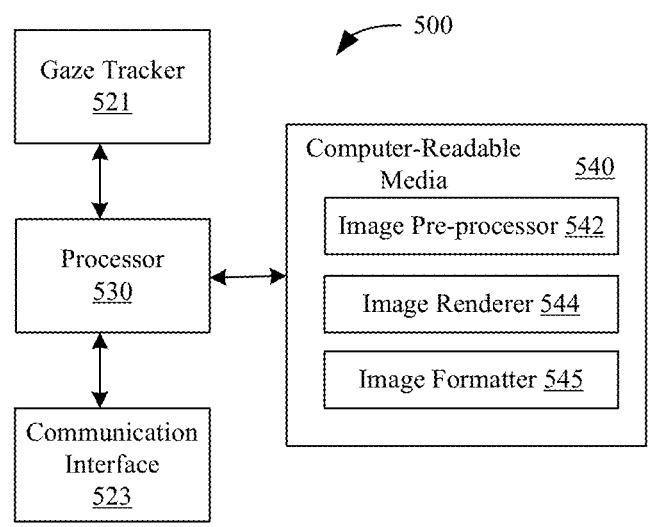
FIG. 5 is a block diagram of an example computing device that may implement various techniques described herein.

FIG. 5 is a block diagram of an example computing device 500 that may implement the various techniques described herein. The display control device 120 shown in FIG. 1 may take the form of the computing device 500. As shown in FIG. 5, the computing device 500 includes a gaze tracker 521, a communications interface 523, a processor 530, and one or more computer readable media 540 storing therein an image pre-processor 542, an image renderer 544, and an image formatter 545 in the form of software.

The gaze tracker 521 may be the gaze tracker 121 as shown in FIG. 1, which generally includes a camera that captures the user's eye movements and other hardware and software resources that calculate the user's gaze region from the data captured by the camera.

The processor 530 may execute computer-executable instructions stored in one or more computer-readable media 540 to implement the functions of the image pre-processor 542, the image renderer 544, the image formatter 545, and optionally one or more other applications, routines, modules, drivers, etc. The processor 530 may be a microprocessor, controller, or any other suitable type of processor for processing computer-executable instructions to control the operation of the computing device 500 in order to perform the techniques described herein. In some examples, such as where a system-on-chip architecture is used, the processor 530 may include one or more fixed function blocks (also referred to as accelerators) that implement part of the techniques as described herein in hardware, instead of software or firmware. Alternatively or additionally, the functionality described herein may be performed at least in part by one or more hardware logic components. By way of example and not limitation, illustrative types of hardware logic components that may be used include Field Programmable Gate Arrays (FPGAs), Application Specific Integrated Circuits (ASICs), Application Specific Standard Products (ASSPs), System on Chips (SOCs), and Complex Programmable logic devices (CPLDs). In some embodiments, the functionality of the processor 530, the image pre-processor 542, the image renderer 544, and the image formatter 545 may optionally be distributed over two or more devices (e.g., a signal source and a display device) which may be located at remote locations and/or configured for collaborative processing. For example, processing and storage resources for implementing the image formatter 545 may be included in a display device.

One or more computer-readable media 540 store computer-executable instructions therein. Computer-readable media 540 may include computer storage media such as, for example, memory and communications media. Computer storage media, such as memory, include volatile and non-volatile, removable and non-removable media implemented in any method or technology for storing information such as computer readable instructions, data structures, program modules, or other data. Computer storage media include, but are not limited to, RAM, ROM, EPROM, EEPROM, flash memory or other memory technology, CD-ROM, digital versatile disk (DVD) or other optical storage devices, cartridges, magnetic tapes, disk storage devices or other magnetic storage devices, or any other non-transport media that can be used to store information for access by a computing device. In contrast, communication media may embody computer readable instructions, data structures, program modules, or other data in a modulated data signal such as a carrier wave or other transport mechanism. As defined herein, computer storage media does not include communication media. Therefore, computer storage media should not be construed as propagated signals per se. The propagated signal may be present in a computer storage medium, but the propagated signal itself is not an example of a computer storage medium. Although the computer-readable media 540 is shown within the computing device 500, it will be appreciated that it may be distributed or remotely located and may be accessed via a network or other communication link (e.g., using the communication interface 523).

The communication interface 523 may be arranged to transmit data to or receive data from a display device and may include a wireless or wired transmitter and/or receiver. As a non-limiting example, the communication interface 523 may be configured to communicate via HDMI cable, wireless local area network, wired local area network, and the like.

The term "computer" or "computing device" is used herein to refer to any device that has processing capabilities such that it can execute instructions. Those skilled in the art will recognize that such processing capabilities are incorporated into many different devices, and thus the terms "computer" and "computing device" each include a PC, a server, a mobile phone (including a smartphone), a tablet computer, a set-top box, a media player, a game console, a personal digital assistant and many other devices.

The methods described herein may be performed by software in machine-readable form on a tangible storage medium (e.g., a computer program including computer program code means adapted to perform all steps of any of the methods described herein when the program is run on a computer and where the computer program can be embodied on a computer readable medium). Software may be suitable for execution on a parallel processor or a serial processor such that the method steps may be performed in any suitable order or simultaneously.

It can be understood that the foregoing is merely exemplary embodiments employed to illustrate the principle of the present disclosure, and that the present disclosure is not limited thereto. For a person of ordinary skill in the art, various variations and improvements may be made without departing from the spirit and essence of the present disclosure. These variations and improvements are also regarded as within the scope of the present disclosure.

What is claimed is:

1. A display control device for a display device, the display control device comprising:
   an image pre-processor configured to divide, based on an identification of a gaze region in a screen of the display device, an original image into a target area corresponding to the gaze region and a non-target area other than the target area, the image pre-processor being further configured to perform pre-processing on the non-target area, the pre-processing comprising reducing a resolution of the non-target area;
   image formatting hardware configured to pad default pixels around a pre-processed image including the target area and the pre-processed non-target area to form a transmission image; and
   a communication interface configured to transmit the transmission image to the display device for magnifying the pre-processed non-target area to match a region other than the gaze region in the screen, and displaying the target area at the gaze region and the magnified non-target area at the region other than the gaze region in the screen, respectively,
   wherein the display device comprises a pixel array arranged in a pattern for sub-pixel rendering, the pixel array including a plurality of sub-pixels arranged in an array, with every two adjacent rows of sub-pixels being misaligned relative to each other by half a width of the sub-pixel, and each sub-pixel having a different color than that of a neighboring one in an adjacent row, and
   wherein the display control device further comprises an image renderer configured to perform the sub-pixel rendering on at least the target area such that the sub-pixel rendered target area can be displayed at the gaze region with an apparent resolution higher than a physical resolution of the display device.

2. The display control device of claim 1, further comprising gaze tracking hardware configured to identify the gaze region in the screen of the display device and provide the identification to the image pre-processor.

3. A display system comprising:
   a display device; and
   the display control device recited in claim 1.

4. The system of claim 3, further comprising gaze tracking hardware configured to identify the gaze region in the screen of the display device and provide the identification to the image pre-processor.

5. A display control method comprising:
   dividing, based on an identification of a gaze region in a screen of a display device, an original image into a target area corresponding to the gaze region and a non-target area other than the target area;
   pre-processing the non-target area, the pre-processing comprising reducing a resolution of the non-target area;
   padding default pixels around a pre-processed image including the target area and the pre-processed non-target area to form a transmission image; and
   transmitting the transmission image to the display device for magnifying the pre-processed non-target area to match a region other than the gaze region in the screen, and displaying the target area at the gaze region and the magnified non-target area at the region other than the gaze region in the screen respectively;
   wherein the display device comprises a pixel array arranged in a pattern for sub-pixel rendering, the pixel array including a plurality of sub-pixels arranged in an array, with every two adjacent rows of sub-pixels being misaligned relative to each other by half a width of the sub-pixel, and each sub-pixel having a different color than that of a neighboring one in an adjacent row, and
   wherein the method further comprises performing the sub-pixel rendering on at least the target area such that the sub-pixel rendered target area can be displayed at the gaze region with an apparent resolution higher than a physical resolution of the display device.

6. The method of claim 5, further comprising acquiring the identification of the gaze region in the screen of the display device.

7. A display control device for use with a display device, comprising:
   means for dividing, based on an identification of a gaze region in a screen of the display device, an original image into a target area corresponding to the gaze region and a non-target area other than the target area;
   means for pre-processing the non-target area, the pre-processing comprising reducing a resolution of the non-target area;
   means for padding default pixels around a pre-processed image including the target area and the pre-processed non-target area to form a transmission image; and
   means for transmitting the transmission image to the display device for magnifying the pre-processed non-target area to match a region other than the gaze region in the screen, and displaying the target area at the gaze region and the magnified non-target area at the region other than the gaze region in the screen, respectively;
   wherein the display device comprises a pixel array arranged in a pattern for sub-pixel rendering, the pixel array including a plurality of sub-pixels arranged in an array, with every two adjacent rows of sub-pixels being misaligned relative to each other by half a width of the sub-pixel, and each sub-pixel having a different color than that of a neighboring one in an adjacent row, and wherein the display control device further comprises means for performing the sub-pixel rendering on at least the target area such that the sub-pixel rendered target area can be displayed at the gaze region with an apparent resolution higher than a physical resolution of the display device.

8. The display control device of claim 7, further comprising means for identifying the gaze region in the screen of the display device.

* * * * *